Feb. 26, 1952     T. F. PETERSON     2,587,521
CABLE REINFORCING AND SUPPORTING DEVICE
Filed June 23, 1945     2 SHEETS—SHEET 1

INVENTOR.
THOMAS F. PETERSON.
BY Fay, Gobrick & Chitton.
Attorneys.

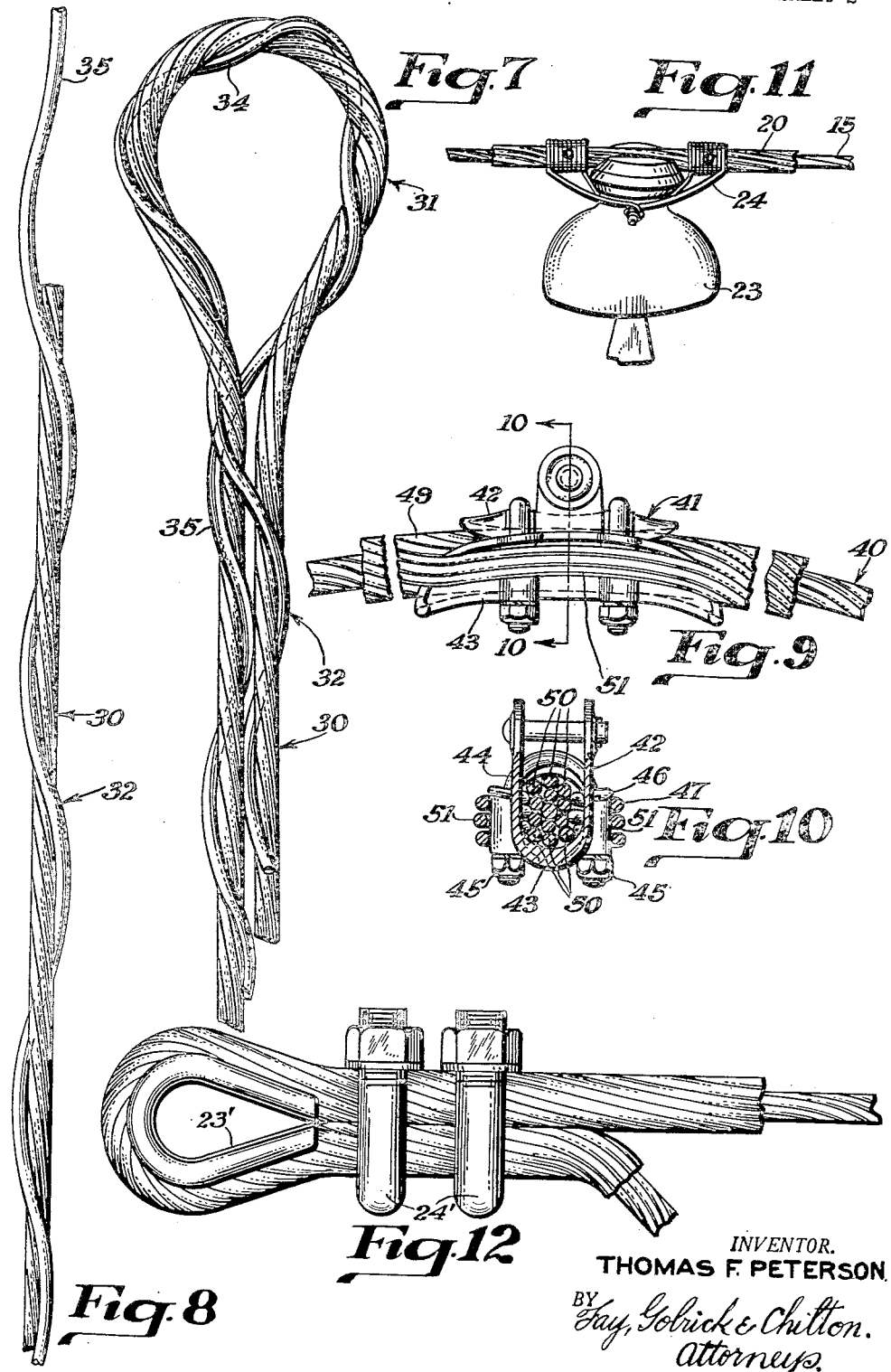

Patented Feb. 26, 1952

2,587,521

UNITED STATES PATENT OFFICE 2,587,521

CABLE REINFORCING AND SUPPORTING DEVICE

Thomas F. Peterson, Shaker Heights, Ohio

Application June 23, 1945, Serial No. 601,245

9 Claims. (Cl. 248—63)

This invention relates to reinforcements suitable for protecting flexible stranded cable, or the like, against abrasion, flexing, and also for splicing broken stranded cables. The invention is related to that described in my Patent No. 2,275,019.

The invention is more particularly directed to reinforcement of an electrical conductor, which conductor is in the form of a stranded cable comprised of two or more elements twisted in the form of a helix. In such types of conductors it has been the practice to place reinforcement elements about the cable at points at which the cable would be subject to flexing or abrasion, as at cable supports and the like. One form of reinforcement commonly used heretofore consisted of a plurality of relatively soft, deformable wires which were wrapped about the cable at the point at which reinforcement was desired, and which wires had substantially the same pitch and lay as the strands of the cable to which it was attached. Of necessity, these reinforcement wires were secured to the cable at their ends by rigid, metallic clamping devices. This form of reinforcement is not satisfactory because flexing of the cable adjacent the reinforced portion would cause the clamps to abrade and wear the cable until a failure in the cable occurred.

Another form of reinforcement, which was a considerable improvement over the type just described, consisted of elongated resilient elements, such as hardened wire, formed in the shape of a helix, the inside diameter of which helix was normally of slightly less than the outside diameter of the stranded cable and one or more of such elements were disposed about the cable in such a manner that the direction of lay of the helix was opposite to the direction of lay of the strands of the cable. That is to say, the helically formed reinforcement elements would cross over the helically wound strands of the cable. This type of reinforcement has not been entirely satisfactory in that the ends of the reinforcing elements would be directed against the strands of the cable in a direction transverse of the strands so that flexing of the cable adjacent the ends of the reinforcement would cause wearing and cutting of the strands by engagement with the ends of the reinforcing elements. Also, the crossing of the reinforcing elements over the strands of the cable causes abrasion of the strands during flexing of the cable.

An object of the invention is to provide a reinforcement for stranded cable and the like, which reinforcement provides a shield for the strands of the cable, and which has a greater frictional gripping action on the cable than reinforcements heretofore employed.

Another object of the invention is to provide a reinforcement for stranded cable and the like, which reinforcement may be used as a means to splice a cable having broken strands therein, the reinforcement affording good electrical and mechanical contact with the cable for establishing a circuit around the breaks in the strands and for tying the strands together mechanically.

Another object of the invention is to provide a reinforcement for stranded cable and the like in which abrasion or cutting of the strands of the cable by the ends of the reinforcing elements is obviated.

Another object of the invention is to provide a reinforcement for a stranded cable or the like, which reinforcement may also be utilized to tie together the two adjacent sections of the cable when a "dead end" is formed in the cable by reversing the cable upon itself.

Still another object of the invention is to provide a reinforcement for stranded cable or the like, which reinforcement may be extended through the usual cable support clamp for providing protection of the cable from the clamping members of the clamp.

A further object of the invention is to provide a cable reinforcement which may be used to by-pass current in an electric cable about the cable support clamp for reducing current losses through magnetic losses in the clamp.

Other objects and advantages of the invention will be apparent from the following description of preferred forms of the invention, reference being had to the accompanying drawings wherein:

Fig. 7 is a view in elevation of a stranded cable in the form of a "dead end," which "dead end" is maintained by my improved reinforcement;

Fig. 8 is a view in elevation showing the cable of Fig. 7 before it is looped to form a "dead end";

Fig. 9 is a side view in elevation of the stranded cable in a cable support;

Fig. 10 is a view in section taken substantially on line 10—10 in Fig. 9;

Fig. 11 is a view of a cable tied to an insulator and having a reinforcement between the cable and insulator; and Fig. 12 is a view in elevation of a stranded cable in the form of a "dead end," and having a reinforcement thereon.

In carrying out the invention I propose to preform elongated reinforcement elements, such as wire, in the form of a helix, which helix has an inside diameter slightly less than the outside diameter of the cable for which the reinforcing elements are to be applied, and the pitch and direction of lay of the helix being substantially the same as the pitch and direction of lay of the strands of the cable. The reinforcing elements are formed of resilient material so that the elements will normally assume, or tend to assume, the original shape of the helix after flexure or distortion thereof. The elements are then placed about the stranded cable so that they will tend to lie and "track" between adjacent strands of the cable. By forming the helix of the reinforcing elements with a diameter of slightly less than the outside diameter of the cable, the reinforcing elements will tightly grip the adjacent strands of the cable throughout the length of the reinforcing elements so that a maximum area of the reinforcing element is in frictional engagement with the cable. Also, by this construction the ends of the reinforcing elements extend substantially in the same direction as the strands of the cable so that flexing of the cable adjacent to the ends of the reinforcing elements will result in the ends of the elements sliding longitudinally along the strands and being guided by two adjacent strands of the cable, thereby obviating any chance for damage to the cable strands by the ends of the reinforcing elements.

By forming the reinforcement as described, it may be utilized for splicing cable having parted strands therein because the reinforcements tightly grip the cable adjacent each side of the break in the strands whereby a good mechanical and electrical connection is made across the broken strands.

Another use to which the gripping qualities of the reinforcement may be used to advantage is where the cable is supported in a closed metallic supporting clamp. In this situation a portion of the reinforcement may be extended on the outside of the clamp so that current may be conducted about the exterior of the clamp and thereby materially reduce magnetic losses which would normally occur in the clamp.

Comparison tests show that a cable reinforced by my improved reinforcement will withstand approximately one hundred times the number of vibrations before failure than a similar cable reinforced by the first mentioned reinforcement, and ten times the number of vibrations than a similar cable reinforced by the second mentioned reinforcement.

Figure 1:
Fig. 1 is a view in elevation of a section of a stranded cable having a reinforcement embodying my invention applied to a cable, a portion of the reinforcement being omitted for clarity.
Figure 3:
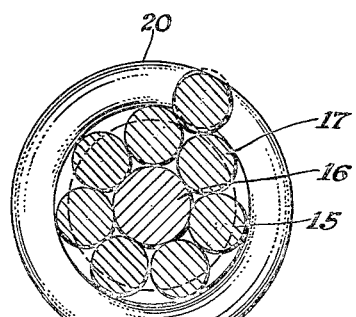
Fig. 3 is a view in section taken on line 3—3 of Fig. 1, but on a larger scale.
Figure 4:
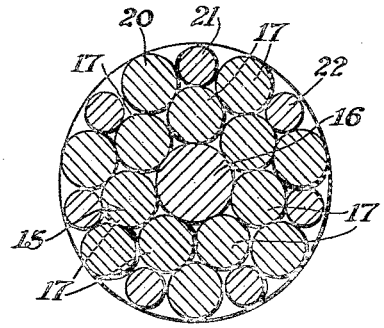
Fig. 4 is a view in section taken on line 4—4 of Fig. 1, but on a larger scale.

Referring now to the drawings, for purposes of illustrating the invention, I have shown a stranded, electric current-carrying cable 15, which cable is shown to comprise a central wire 16 about which seven strands of wire 17 are helically wound. The reinforcement for the cable 15 comprises a plurality of resilient, elongated elements which comprise wires 20, preferably formed of resilient material, such as galvanized spring steel, hard drawn copper, bronze, copper covered steel, or suitable aluminum alloys, although it is to be understood that other materials having electrical insulating value may be used, such as synthetic and treated wood. The wires are each in the form of a helix normally having an inside diameter that is substantially less than the outside diameter of the cable 15, that is to say, the diameter of a circle circumscribing the outside of the cable, and the pitch and direction of lay of the helix is normally substantially the same as the pitch and direction of lay of the strands 17 of the cable 15. The wires are resilient, permitting a certain amount of deflection of the helix without causing permanent distortion thereof from its normal form so that when the wires 20 are placed about the cable the resiliency of the wires will cause them to tightly grip the cable and to tend to lie intermediate adjacent strands, or to "track" with the cable strands, as may be seen in Figs. 3 and 4. It will be apparent that the wires 20 will contact the strands 17 throughout the length thereof in close frictional engagement with the strands of the cable. Thus, an exceedingly effective mechanical and electrical contact will be made between the reinforcing wires and the strands of the cable. The wires 20 may be applied to the cable individually by holding one end portion of each wire adjacent the cable and then revolving the free end about the cable in the direction of the lay of the helix. The resiliency of the wires permits them to be deflected in this operation, as is illustrated by the dotted lines in Fig. 1.

By forming the reinforcing wires 20 in the form of a helix having the direction of lay the same as that of the strands of the cable the end portions of the reinforcing wires will extend substantially in the same direction as the strands of the cable at the ends of the reinforcing wires so that flexing or vibration of the cable adjacent said ends will merely result in the ends of the reinforcing wires sliding along the strands without causing appreciable wear or abrasion at the ends of the reinforcement.

Preferably, in order to fill out the reinforcement, wires 21, which may be formed of materials similar to that of wires 20, and also in the form of a helix having the pitch and direction of lay thereof substantially the same as that of the pitch and direction of lay of the wires 20 are placed on the cable and lie intermediate the reinforcing wires 20.

Although it is desirable that the pitch of the helix in which the reinforcing wires 20 are formed be the same as the pitch of the strands of the cable, the pitches may be at somewhat of a variance without materially impairing the effectiveness of the reinforcement. In such event, the reinforcing wires will gradually rise out of the tracks formed by adjacent cable strands and ride over the latter. However, tight frictional engagement will be retained with the strands of the cable throughout the length of the reinforcing wires and the wires will tend to track between the strands and the cable so that a maximum area of surfaces of the strands 17 and wires 20 will be in engagement.

The cable reinforcement is particularly suitable for reinforcing cables at insulator supports, and such use is illustrated in Fig. 11, wherein a cable 15 is reinforced by the wires 20 and is supported by an insulator 22. The cable is tied to the insulator by wire 24 which is wrapped around the reinforcement and the insulator. Thus, the reinforcement protects the cable from contact with the insulator and wire 24 and there is no appreciable abrasion of the cable by reason of vibration of the cable relative to the reinforcement.

Another example of the utility of my novel cable reinforcement is in forming "dead ends" as illustrated in Fig. 12. In this instance, the reinforcement wires 20 are applied at an end portion of the cable and a bight is formed in this portion of the cable. Preferably, the bight is formed about a metallic eye 23' and a pair of yoke-shaped clamps 24', which are well known in the art, are used to clamp the parallel portions of the reinforced cable together. It is apparent that although the cable may be subject to considerable vibration, the strands are fully protected from abrasion with the clamps.

Another novel feature of the reinforcement is that it may be applied to a cable having parted strands for reestablishing the mechanical and electrical properties of the cable. In effecting such repair, the reinforcing elements are applied so that the parted strand or strands fall approximately midway between the ends of the reinforcing elements. The reinforcing elements tightly grip the cable in opposite sides of the broken strands.

Figure 5:
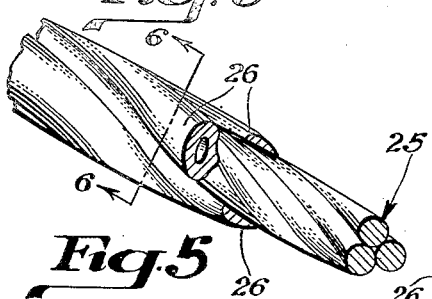
Fig. 5 is a fragmentary view of another form of cable reinforcement applied to a cable.
Figure 6:
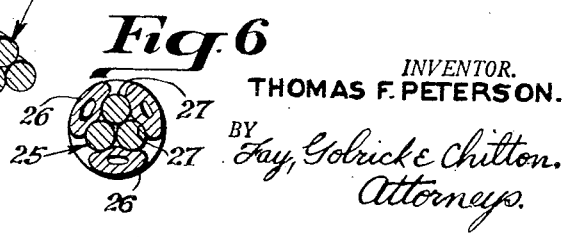
Fig. 6 is a view in section taken on line 6—6 in Fig. 5.

Another form of cable reinforcement is shown in Figs. 5 and 6, wherein, for purposes of illustration, a three-wire cable 25 is shown having three tubular, resilient reinforcement elements 26 thereon. The reinforcement elements 26 are each normally in the form of a helix, which helix has an inside diameter of substantially less than the diameter of a circle circumscribing the cable 25 and the pitch and direction of lay of the helices are the same as the pitch and direction of lay of the strands forming the cable 25. Each of the elements 26 has two adjacent concaved surfaces extending along the inside of the helix formed thereby, which surfaces substantially conform to two adjacent surfaces of the strands forming the cable. Thus, when the elements 26 are applied to the cable, the concave surfaces 27 embrace the adjacent surfaces of the cable strands whereby a maximum area of the elements 26 are in frictional engagement with the strands of the cable. By forming the elements 26 of oval cross section a more nearly cylindrical form of reinforcement is obtained without the use of additional reinforcement elements to fill in intermediate the elements 26. It is to be understood that the elements 26 may be formed of materials mentioned with reference to wires 20, and that the elements 26 may be applied to the cable in a similar manner as described with reference to the application of the wires 20.

Referring to Figs. 7 and 8, I have shown a stranded cable 30 having a "dead end" 31 formed therein by looping the end portion of the cable and tying together the portions of the cable adjacent the loop with a reinforcing element 32, although two such elements may be employed, if desired. The reinforcement element 32 may be formed of a resilient wire, such as that described with reference to elements 20, and it is in the form of a helix having substantially the same pitch and direction of lay as the helix formed by the strands of the cable 30 and the inside diameter of the helix is less than the outside diameter of the cable so that the element may be applied to the cable in the same manner as described with reference to the elements 20. In forming the "dead end" connection the central portion of the reinforcing element 32 is applied to the cable 30 with the end portions of the reinforcement element being free of the cable. The cable is then formed in a loop at the portion about which the central part of the reinforcement element is associated. The free end portion 35 of the reinforcement element is crossed over to the portion 36 of the cable and applied to that portion of the cable, and the opposite end of the reinforcement element is crossed over to the adjacent portion of the cable and is applied thereto. An unusually strong tie is effected in this manner as the reinforcement elements each tightly grip the cable to effect a strong mechanical connection therewith. When the dead ends are formed in this manner, no other clamps or securing means are necessary. Thus, an exceedingly inexpensive and effective means is provided for tying the adjacent portions of the cable together, which means may be quickly and easily applied and has tremendous gripping and snubbing powers.

My novel cable reinforcement may also be employed to protect a cable from injury by a cable supporting clamp and to also reduce current losses in the cable and clamp by conducting current through and beyond the clamp.

Figure 2:
Fig. 2 is a view in elevation of a single reinforcement element of the cable reinforcement shown in Fig. 1, the element being shown on a larger scale than those in Fig. 1.

Referring to Figs. 9 and 10, I have shown a stranded cable 40 that is supported by a well known type of cable supporting clamp 41, the clamp comprising upper and lower clamp members 42 and 43. The clamp member 42 is adapted to be drawn against the wire resting in member 43 by inverted U-shaped bolts 44 and 45. The clamp is of metal, and ordinarily there is an appreciable current loss due to current induced therein from the current passing through the cable. The cable 40 is comprised of a central wire 46 and six strands 47 wound in a helix thereabout. The reinforcement 48 comprises a plurality of resilient metallic elements 49, formed similarly to that described with reference to the reinforcement of Figs. 1 and 2, with the exception that the portions 50 and 51, which pass through the clamp and about the outside of the clamp respectively, are relatively straight while the outer ends are in the form of helices, preferably of at least several turns each. Preferably, the helices formed on opposite ends of the portions 50 and 51 have substantially the same pitch and direction of lay as that of the strands forming the cable 40 and the inside diameter of the helices are slightly less than the outside diameter of the cable so that these elements will grip the cable and track with the strands in the manner brought out with respect to the elements 20. The spring contact between the cable and reinforcement provides good electrical connection between the cable and reinforced elements so that the reinforcement assists in conducting current through and around the clamp. This reduces current losses in the cable and minimizes current induced in the clamp. Thus, current losses incident to the use of this type of cable supporting may be reduced by use of my invention materially. Also, by interposing the sections 50 between the clamp members and the cable, the cable is shielded from contact with the clamp. The clamp 41 will not accommodate the usual types of reinforcements.

By my invention I have provided an extremely simple reinforcement for stranded cables and the like, which reinforcement is easily applied to a cable, and produces substantially no abrasion, cutting or wearing on the cable. Also, the extensive bearing area between the reinforcements and cable strands, together with the resilient gripping effect, provides excellent electrical and mechanical contact between the reinforcement and the cable so that the cable may be effectively spliced together by the reinforcement.

Although I have described several forms of embodiments of the invention, it is to be understood that the invention may be embodied in other forms, all falling within the scope of the following claims.

I claim:

1. In combination, a stranded cable and the like, a plurality of resilient elongated reinforcement elements for said cable, said elements being distributed substantially symmetrically around said cable as regarded in right section, each element being helically preformed to constitute a helix surrounding said cable, said helix throughout its length having a preformed inside diameter less than the outside diameter of the stranded cable, and having the pitch and direction of the lay thereof substantially the same as the pitch and direction of the lay of the strands of said cable, whereby said elements extend in frictional contact with adjacent strands of said cable respectively.

2. In combination, a stranded cable and the like, a plurality of resilient elongated reinforcement elements for said cable, said elements forming an essentially closed tubular covering for said cable along the area of application, each element being helically preformed to constitute a helix surrounding said cable, said helix throughout its length having a preformed inside diameter less than the outside diameter of the stranded cable, and having the pitch and direction of the lay thereof the same as the pitch and direction of the lay of the strands of said cable, whereby said elements extend in frictional contact with the strands of said cable respectively.

3. In combination, a stranded cable, a plurality of elongated resilient reinforcing elements preformed into helical configurations of uniform pitch and diameter throughout their length surrounding a portion of said cable, said elements being distributed around said cable as regarded in right section in balanced relation, said elements having a preformed internal diameter smaller than the overall diameter of said cable and a direction of lay agreeing with that of said cable, the pitch length of said elements when positioned on said cable substantially corresponding to the pitch of the lay of the strands in the cable so as to tend to track with the latter throughout a major longitudinal extent of the surrounding portion of cable, and to change the track, if at all, by gradually rising from between two adjacent strands and crossing over to proximate strands at an angle differing but little from the pitch angle of the latter, whereby to effect line contact between the elements of the strands of the cable throughout the major part of their co-extensiveness.

4. In combination, a stranded cable, or the like; and a resilient, elongated reinforcement element for the cable in the form of a helix and surrounding said cable, said element having two adjacent concave sections formed therein and extending along the inside of the helix, said helix normally having the inside diameter thereof less than the outside diameter of the stranded cable and the pitch and direction of lay of said helix being substantially the same as the pitch and direction of lay of the strands of said cable whereby said concave sections frictionally engage a section of the surfaces of two adjacent strands of said cable substantially throughout the length of said element.

5. In combination, a stranded cable, or the like; in the form of a reverse turn, two sections thereof extending adjacent to one another; and an elongated, resilient element helically-preformed to constitute a helix surrounding the reversed curved sections of the cable, one end portion of the element extending from one of said two adjacent sections of the cable and surrounding the other of said two sections, said helix having preformed inside diameter of less than the diameter of the cable and the pitch and direction of lay of the helix being substantially the same as the pitch and the direction of lay of the strands of the cable.

6. In combination, a stranded cable, or the like, in the form of a reversed turn, two sections thereof extending alongside one another; and an elongated resilient element helically preformed to constitute a helix surrounding the reversed turn section of the cable, one end portion of the element extending from one of said two sections of the cable and surrounding the other of said two sections, and the other end portion of said element extending from the said other section to said one section and surrounding said one section, said helix being preformed to an inside diameter less than the outside diameter of the stranded cable, and to a pitch and direction of lay that are substantially the same as the pitch and direction of lay of the strands of the cable.

7. In combination, a stranded cable, or the like; a support clamp for the cable including, members for clamping opposite sides of the cable; and a plurality of resilient, elongated reinforcing elements, each being helically preformed to constitute two helices interconnected by relatively straight sections, said helices surrounding the sections of the stranded cable on opposite sides of said support clamp, and said straight sections of said elements extending along the outer sides of said clamp, the preformed inside diameter of said helices being less than the outside diameter of the stranded cable and the pitch and direction of lay of the helices being substantially the same as the pitch and lay of the strands of the cable.

8. In combination, a stranded cable, or the like; a support clamp for the cable including, members for clamping opposite sides of the cable; and a plurality of resilient, elongated reinforcing elements, each being helically preformed to constitute two helices interconnected by relatively straight sections, said helices surrounding the sections of the stranded cable on opposite sides of said support clamp, the straight sections of certain of said elements extending along the outer side of said clamp and the straight sections of other of said elements extending along said cable and intermediate the cable and clamping members of said clamp, the normal inside diameter of said helices as preformed being less than the outside diameter of the stranded cable and the pitch and direction of lay of the helices being substantially the same as the pitch and lay of the strands of the cable.

9. In combination, a stranded cable, or the like; a support clamp for the cable including, members for clamping opposite sides of the cable; and a plurality of resilient, elongated reinforcing elements, each in the form of two helices interconnected by relatively straight sections, said helices surrounding the sections of the stranded cable on opposite sides of said support clamp, and said straight sections of said elements extending along the outer sides of said clamp.

THOMAS F. PETERSON.

REFERENCES CITED

The following references are of record in the file of this patent:

UNITED STATES PATENTS

| Number | Name | Date |
| --- | --- | --- |
| 646,091 | Hammond | Mar. 27, 1900 |
| 1,873,798 | Varney | Aug. 23, 1932 |
| 2,078,424 | Stinchcomb | Apr. 27, 1937 |
| 2,172,810 | Sherman | Sept. 12, 1939 |
| 2,202,538 | Selquist | May 28, 1940 |
| 2,230,611 | Coffin | Feb. 4, 1941 |
| 2,275,019 | Peterson | Mar. 3, 1942 |
| 2,374,823 | Leib et al. | May 1, 1945 |
| 2,421,286 | Pyle | May 27, 1947 |